US007823826B1

(12) United States Patent
Lewis

(10) Patent No.: US 7,823,826 B1
(45) Date of Patent: Nov. 2, 2010

(54) VSTOL AIRCRAFT

(75) Inventor: William James Lewis, Somerset (GB)

(73) Assignee: Rolls-Royce Limited, London (GB)

( * ) Notice: Subject to any disclaimer, the term of this patent is extended or adjusted under 35 U.S.C. 154(b) by 0 days.

(21) Appl. No.: 06/325,355

(22) Filed: Nov. 4, 1981

(30) Foreign Application Priority Data

Nov. 26, 1980 (GB) .................................. 8037958

(51) Int. Cl.
*B64C 29/00* (2006.01)
*B64C 21/04* (2006.01)
(52) U.S. Cl. .................................. 244/12.5; 244/207
(58) Field of Classification Search ................ 244/12.4, 244/12.5, 23 D, 62, 207, 12.1, 198, 204; 60/226.1, 229, 230, 232; 239/265.35
See application file for complete search history.

(56) References Cited

U.S. PATENT DOCUMENTS

| 3,096,954 A | * | 7/1963 | Bauger et al. ............. 244/23 D |
| 3,164,337 A | * | 1/1965 | Hooper ...................... 244/12.5 |
| 3,226,032 A | * | 12/1965 | Kurti ..................... 239/265.25 |
| 3,761,042 A | * | 9/1973 | Denning ................... 244/12.5 |
| 3,887,146 A | * | 6/1975 | Bright ....................... 244/12.1 |
| 3,893,638 A | * | 7/1975 | Kelley ....................... 244/12.5 |
| 4,326,686 A | * | 4/1982 | Runge ......................... 244/207 |
| 4,343,446 A | * | 8/1982 | Langley ..................... 244/12.5 |

FOREIGN PATENT DOCUMENTS

GB             2050260        *   1/1981     ................ 244/12.4

* cited by examiner

*Primary Examiner*—Timothy D Collins
*Assistant Examiner*—Joseph W Sanderson
(74) *Attorney, Agent, or Firm*—Oliff & Berridge, PLC

(57) ABSTRACT

An aircraft having a gas turbine engine with vectorable cold and hot nozzles. The aircraft is provided with a ducting in the wing which extends from an inlet facing downwards to an outlet in the upper surface of the wing directed rearwardly. The cold vectorable nozzles of the engine are designed so that they can be swung from a vertical downward position to provide vertical lift to a horizontal position directed rearwardly to produce forward thrust, to a position where they are directed upwardly and discharged into the ducting 24. In this way, the air discharged through the outlet of the ducting 24 enhances the aerodynamic lift produced by the wing at slower speeds by inducing the air flow over the wing. In addition, the forward component of the thrust produced in the ducting provides a forward thrust on the aircraft, whilst additional forward thrust is produced by swiveling the hot nozzles.

7 Claims, 4 Drawing Sheets

VSTOL AIRCRAFT

This invention relates to aircraft provided with a vectored thrust gas turbine engine.

The most common form of vectored thrust engine in use is Rolls-Royce Limited's Pegasus installed in the Harrier, the AV8A and the AV8B aircraft. This engine comprises two vectorable cold nozzles and two vectorable hot nozzles. All the nozzles are movable in unison from a position where they are directed downwardly to produce upward thrust, to a position where they are directed rearwardly to produce forward thrust.

In future designs of vertical take off or short take off aircraft, and particularly for example, cargo carrying or transport aircraft, it is necessary to optimise the aerodynamic lift whilst still maintaining adequate forward thrust to maintain forward flight.

An object of the present invention is to provide an aircraft with means enabling the efflux from the cold vectorable nozzles to enhance the aerodynamic lift.

According to the present invention there is provided an aircraft having one or more gas turbine engines of the type in which a compressor supplies air to a vectorable cold nozzle and the efflux of hot gases from a turbine is supplied to a vectorable hot nozzle wherein the aircraft is provided with ducting having an outlet positioned and directed to direct air, which in use flows through the ducting, over the upper surface of an aerofoil to produce aerodynamic lift, wherein the ducting has an inlet positioned to receive air discharged from the cold nozzle and the cold nozzle is moveable to and from a first position where the cold nozzle is directed away from the ducting and a second position where the cold nozzle discharges into the inlet of the ducting.

Preferably, the ducting has a downward or rearward facing inlet, a rearward facing outlet and a wall portion against which a net forward component of thrust is produced in use when the cold nozzle discharges into the ducting.

The cold nozzle may be movable in unison with the hot nozzle from a first position where the nozzles are directed downwardly to a position where they are directed rearwardly. In this case the cold nozzle is preferably movable independently of the hot nozzle to a position where it discharges into the ducting.

The ducting may discharge over one or more movable flaps provided at a trailing edge of a wing of the aircraft.

There may be a plurality of hot or cold nozzles.

The ducting may comprise a first flow passage extending along the wing and a flap having a second flow passage intercommunicating with the first flow passage defined by two spaced walls. In this case the flap is movable relative to the rest of the wing to vary the direction of thrust produced by the air flowing through the first and second flow passages.

Figure 1:
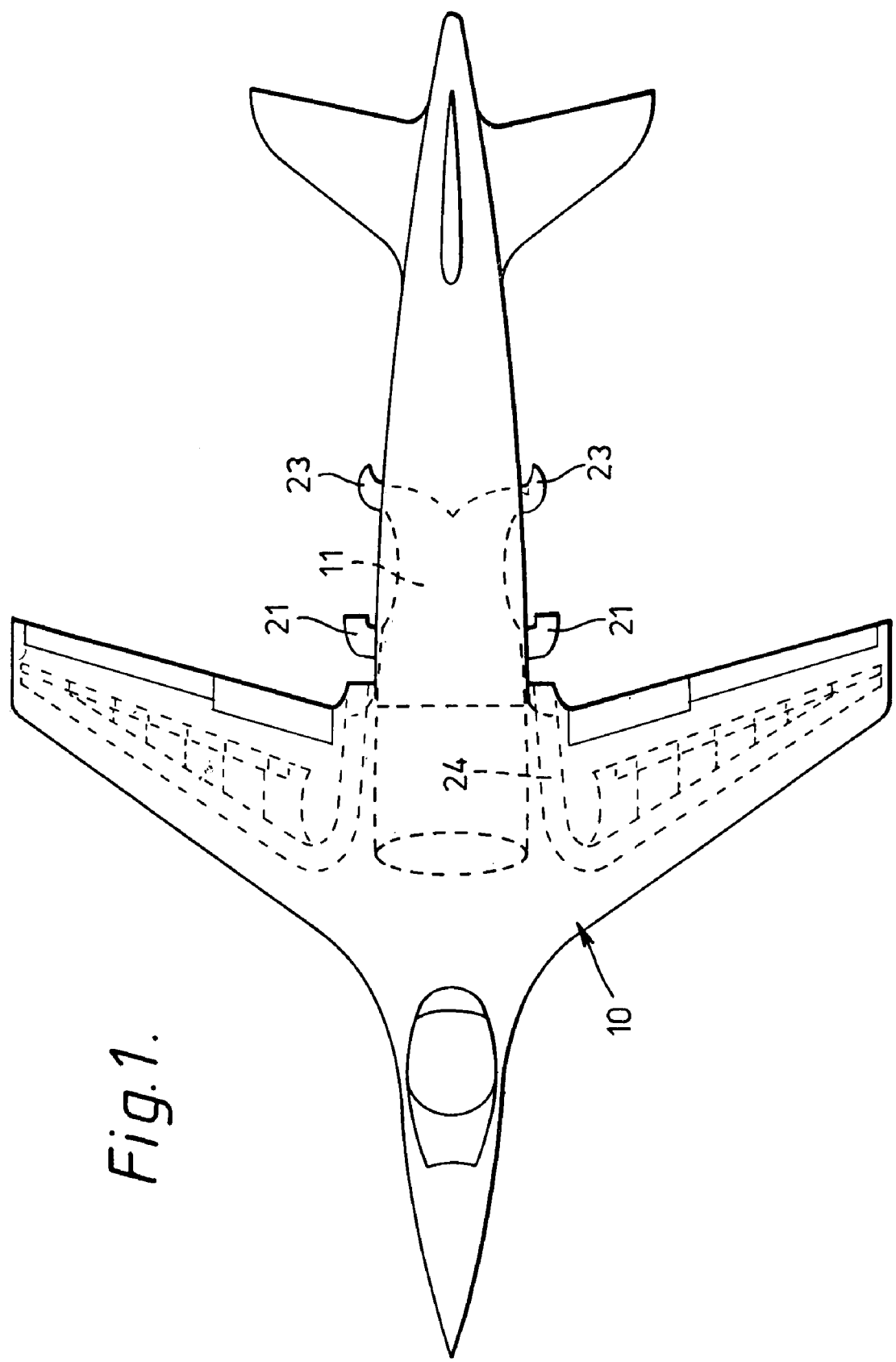
Figure 2:
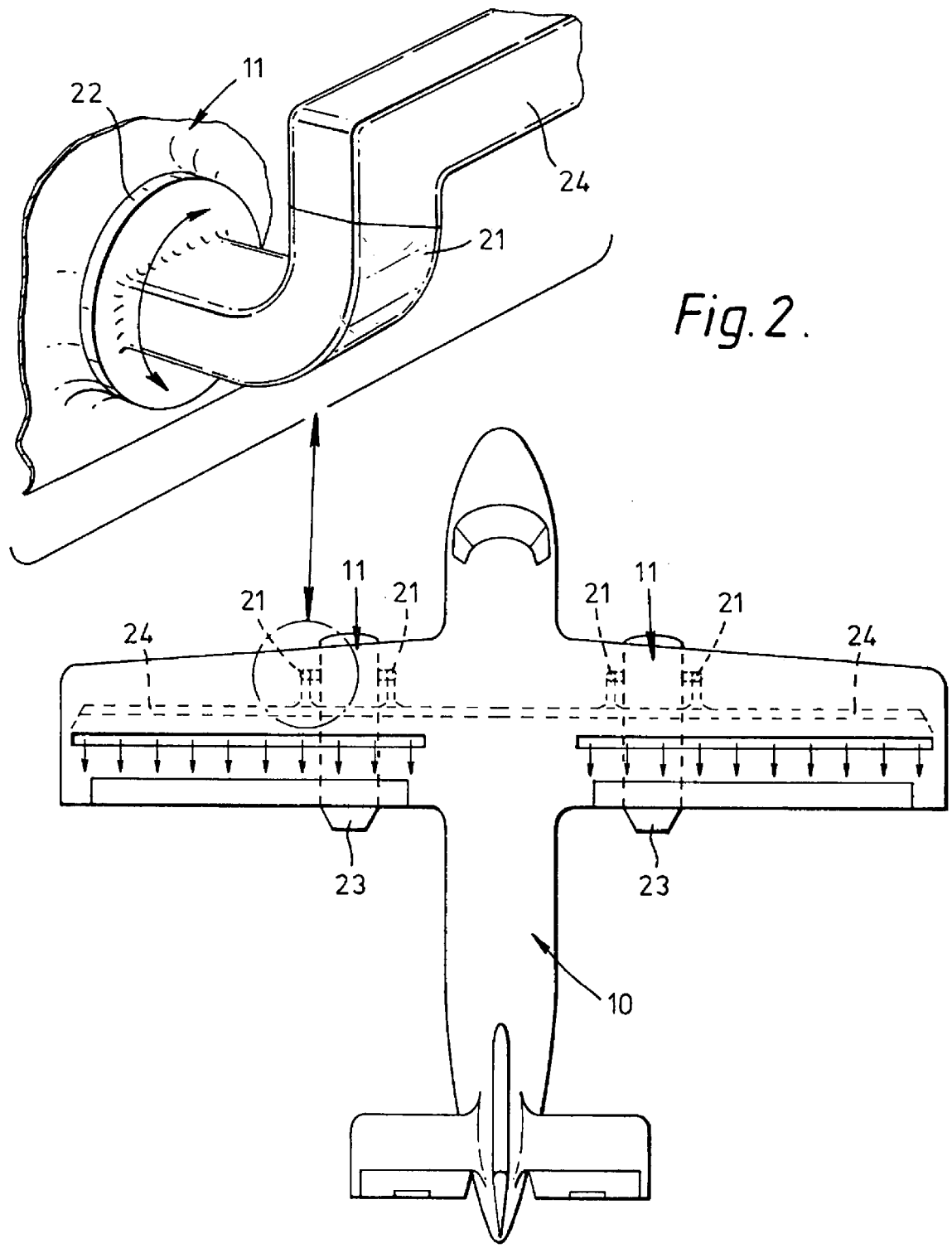
Figure 3:
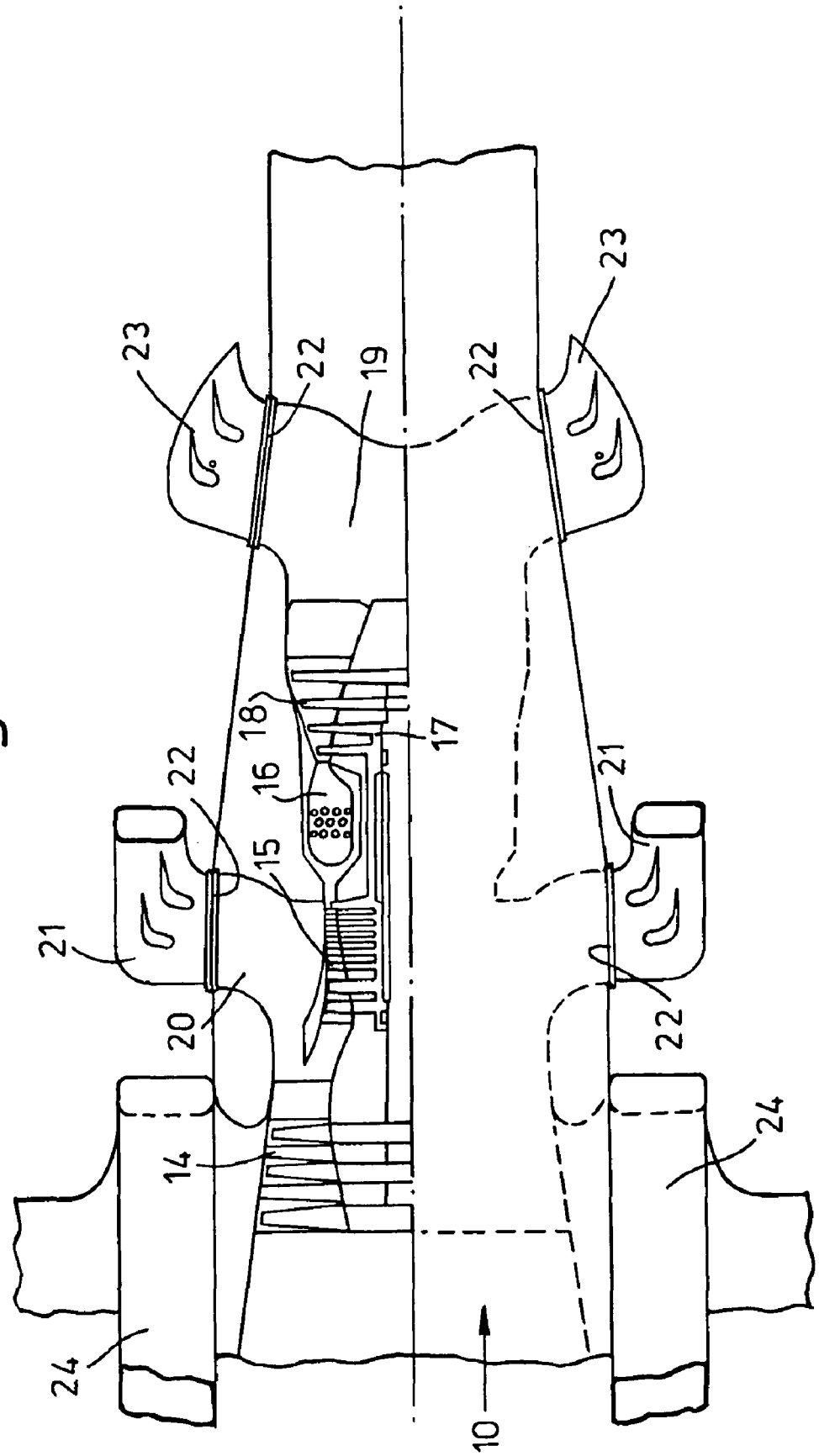
Figure 4:
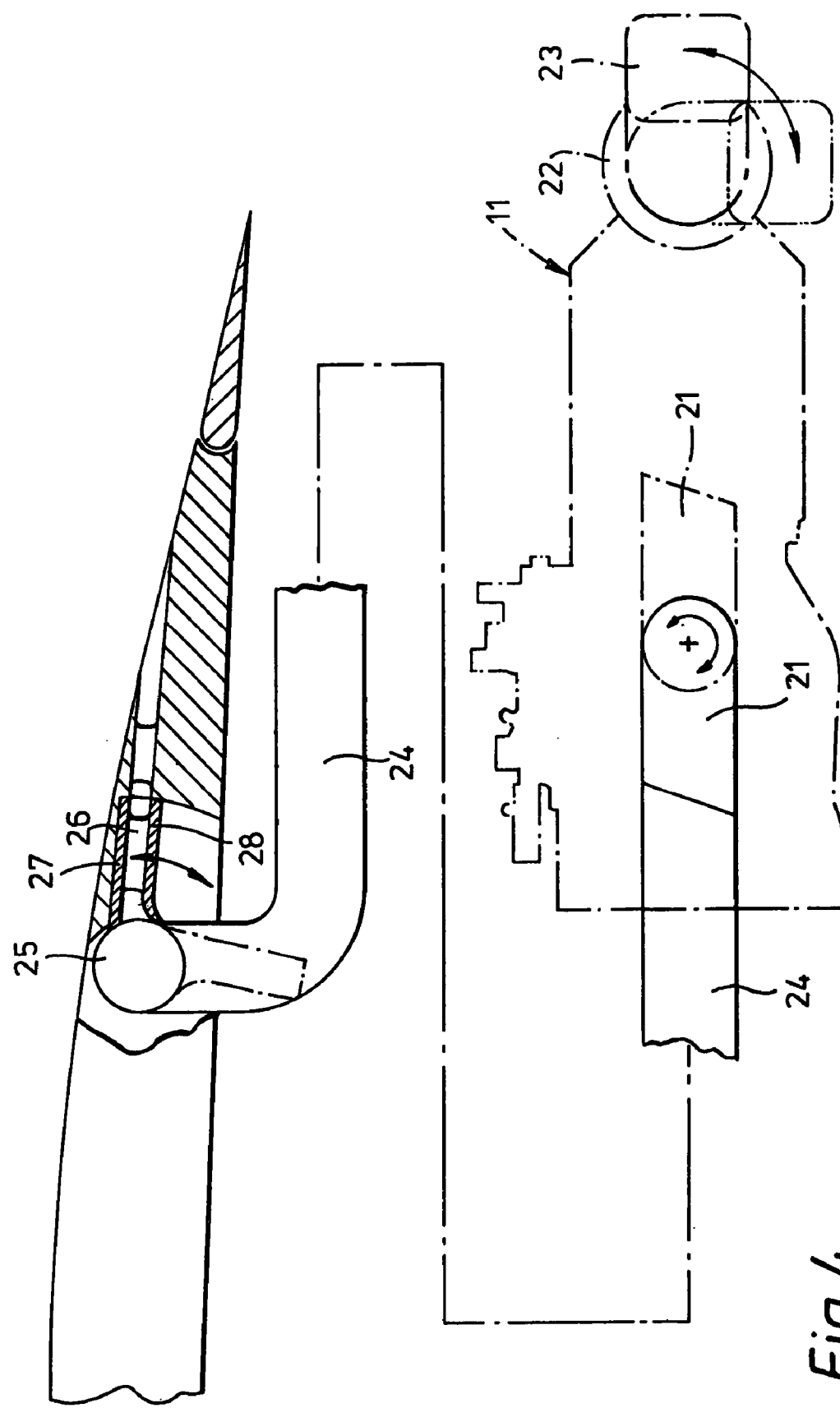

The present invention will now be described by way of an example with reference to the accompanying drawings in which:

FIGS. 1 and 2 illustrate schematically aircraft constructed in accordance with the present invention, FIG. 3 illustrates a plan view of the engine of the aircraft of FIG. 1, and, FIG. 4 illustrates further details of the aircraft of FIGS. 1 and 3 and shows a cross sectional view through the wing of the aircraft.

Referring to the drawings FIG. 1 shows an aircraft 10 having a gas turbine engine 11 of the by-pass type. Compressed air from a compressor of the engine is supplied to two vectorable cold nozzles 21 (one on each side of the engine) and the hot efflux from the turbine of the engine is supplied to two vectorable hot nozzles 23 located aft the cold nozzles (there being one hot nozzle each side of the engine). Further details of the engine 11 are shown in FIG. 3. Referring to FIG. 3, the engine 11 comprises two contra rotating spools defining in flow series, a multi-stage axial flow low pressure compressor 14, a high pressure compressor 15, a main combustor 16, a high pressure turbine 17, a low pressure turbine 18 and a jet pipe 19.

Compressed air from the L.P. compressor 14 is fed to the H.P. compressor 15 and to a bifurcated by-pass plenum chamber 20 which terminates at each side of the engine in a vectorable cold nozzle 21. The nozzles 21 are mounted in bearings 22 so as to be capable of rotating relative to the engine casing. Similarly, the bifurcated jet pipe 19 terminates each side of the engine in a vectorable nozzle 23 which is mounted in bearings 22 to be movable relative to the engine casing.

The aircraft is provided at each side with ducting 24 (FIG. 4). The ducting 2) has an inlet opening positioned to receive cold air that is ejected from the nozzles 21 when the nozzles 21 are directed forwards. The nozzles 21 are rotatable from the position where they discharge into the inlet of the ducting 24, through an angle slightly in excess of 180° so that they can be directed in any direction from forwards, through a position where they are directed rearwards to a position where they are directed downwards. The hot nozzles 23 are rotated in unison with the cold nozzles from the position where they are directed rearwardly through to a position where they are directed downwardly. The cold nozzles are movable independently of the hot nozzles from the rearward direction to a direction where they discharge into the inlet of the ducting 24.

The ducting 24 has its inlet facing rearwards and its outlet directed rearwards and opens at the upper curved surface of the aerofoil section of the wing. In this way, air entering the ducting 24 from the cold nozzles 21, is directed rearwardly to induce air flow over the aerofoil surface and increase aerodynamic lift. The ducting 24 is also shaped so that it has a front curved portion against which a net forward thrust component acts when the air is ejected into the ducting from the cold nozzles 21.

In operation, the nozzles 21 are directed forwards so as to produce aerodynamic lift for short take off and the nozzles 23 are translated from the vertical position to a position rearwards where the combined thrust produced by the ducting 24 and nozzles 23 produces a forward thrust on the aircraft, and enhances the aerodynamic lift produced by the wing. The outlet of the ducting 24 extends along a thin slot extending over at least the major portion of the length of the wing. If desired, the ducting could terminate at the leading edge of a flap. To further improve the lift of the aircraft whilst the nozzles 21 are in the position where they discharge into the ducting 24, the nozzles 23 may be redirected so that they produce a thrust with vertical and forward components so that the combined forward thrust produced by the hot nozzles 23 and the thrust produced on the front portion of the ducting 24 propels the aircraft forward.

If desired, as shown in FIG. 4, there may be are elongate flow passage in the form of a pipe 25 extending along the length of the wing and a portion of the wing downstream of the pipe may be in the form of a flap 26 having two spaced walls 27,28 defining a second flow passage extending from the pipe 25 to the outlet of the ducting. The flap 26 is preferably hinged about an axis extending along the length of the pipe 25 so that in effect the ducting 24 and the flap is movable relative to the rest of the wing. In this way the flap may be directed downwards so that the outlet faces downwards to produce vertical upwards lift, and may be directed rearwards to produce forward thrust and upwards aerodynamic lift. The pipe may rotate about its longitudinal axis with the flap.

In the above embodiments of the invention the engine is provided with two vectorable hot nozzles 23. It is to be understood that instead of providing a bifurcated jet pipe 19, the jet pipe 19 may be an elongated cylinder which terminates in a single vectorable nozzle 23.

Referring to FIG. 2 there is shown a transport aircraft of the type having its propulsive engines located in pods under the wings. This arrangement lends itself readily to the incorporation of the present invention since each engine may comprise a by-pass gas turbine engine similar to that shown in FIG. 3 but having one or more vectorable cold nozzles, and a single vectorable hot nozzle.

The or each cold nozzle is rotatable from a position directed slightly forwards to provide reverse thrust, through a position directed vertically downwards, through a position directed rearwards to a final position pointing upwards where the cold nozzles direct cold air into ducting within the wings. The ducting has an exit opening directed rearwards in the upper surface of the wing to enhance aerodynamic lift as discussed above.

I claim:

1. An aircraft having one or more gas turbine engines of the type in which a compressor supplies air to a vectorable cold nozzle and the efflux of hot gases from a turbine is supplied to a vectorable hot nozzle, wherein the aircraft is provided with ducting having an outlet positioned and directed to direct air which in use flows through the ducting over the upper surface of an aerofoil, to produce aerodynamic lift, wherein the ducting has an inlet positioned to receive air discharged from the cold nozzle and the cold nozzle is movable to and from a first position where the cold nozzle is directed away from the ducting and a second position where the cold nozzle discharges into the inlet of the ducting.

2. An aircraft according to claim 1 wherein the ducting has a rearwardly facing outlet and a wall portion against which a net forward component of thrust is produced in use when the cold nozzle discharges into the ducting.

3. An aircraft according to claim 1 wherein the cold nozzle is movable in unison with the hot nozzle from a first position, where the nozzles are directed downwardly, to a position where they are directed rearwardly, and the cold nozzle is movable independently of the hot nozzle to a position where it discharges into the ducting.

4. An aircraft according to claim 1 wherein the ducting discharges over one or more movable flaps provided at a trailing edge of a wing of the aircraft.

5. An aircraft according to claim 1 wherein there are a plurality of cold nozzles each of which discharges into a ducting.

6. An aircraft according to claim 1 wherein there are a plurality of hot nozzles.

7. An aircraft according to claim 1 wherein the ducting comprises a first flow passage extending along the wing and a flap, having a second flow passage intercommunicating with the first flow passage, defined by two spaced walls, wherein the flap is movable relative to the rest of the wing to vary the direction of thrust produced by the air flowing through the first and second flow passages.

* * * * *